United States Patent [19]
Bell

[11] 3,869,726
[45] Mar. 11, 1975

[54] GLOVE LINER AND GLOVE COMPRISING SUCH LINER

[75] Inventor: Alfred Wharton Bell, Ash near Aldershot, England

[73] Assignee: Siebe Gorman & Company Limited, Chessington, Surrey, England

[22] Filed: July 19, 1973

[21] Appl. No.: 380,761

[30] Foreign Application Priority Data
July 19, 1972 Great Britain.................... 33850/72

[52] U.S. Cl. ........................................ 2/164, 2/169
[51] Int. Cl. ............................................... A41d 19/00
[58] Field of Search ....... 2/159, 161, 164, 169, 158, 2/163

[56] References Cited
UNITED STATES PATENTS

| | | | |
|---|---|---|---|
| 2,386,688 | 10/1945 | Julianelli et al................... | 2/169 |
| 2,716,241 | 8/1955 | Goodman .............................. | 2/169 |
| 2,779,025 | 1/1957 | Perry ................................. | 2/167 |
| 2,838,759 | 6/1958 | Tassie ................................. | 2/167 |
| 2,849,786 | 9/1958 | Ashley et al. ...................... | 2/159 |
| 2,903,704 | 9/1959 | Plant................................... | 2/169 |
| 3,026,531 | 3/1962 | Holaday.............................. | 2/167 |
| 3,106,502 | 10/1963 | Starger et al. ..................... | 156/251 |
| 3,173,150 | 3/1965 | Mohler .............................. | 2/167 |
| 3,387,307 | 6/1968 | Blatz................................... | 2/167 |
| 3,548,414 | 12/1970 | Fujita................................. | 2/169 |
| 3,625,790 | 12/1971 | Ayres.................................. | 2/159 |
| 3,760,425 | 9/1973 | Komatsu............................. | 2/169 |

Primary Examiner—Geo. V. Larkin
Attorney, Agent, or Firm—Brisebois & Kruger

[57] ABSTRACT

A liner suitable for use in the manufacture of plastics-coated gloves is made by cutting and heat welding a fabric which is coated with a suitable heat-weldable material. The liner is of a configuration in which there is a curved slot between the thumb and first finger extending towards the palm below the first finger so that a glove having a rounded crutch between the thumb and first finger can be provided.

8 Claims, 7 Drawing Figures

GLOVE LINER AND GLOVE COMPRISING SUCH LINER

The invention relates to the manufacture of liners for gloves made of polyvinyl chloride or other suitable plastics material.

Such gloves have previously been made by dipping liners arranged on formers into a plastisol of polyvinyl chloride, which is then fused or gelled. The liners are usually made of a circular knitted cotton fabric such as cotton interlock.

Such a knitted material as cotton interlock has been found to be especially suitable for the liners because the plastisol can penetrate into the material to a certain extent, the desired result being that the plastisol penetrates sufficiently for the plastics coating to adhere well to the liner but not penetrate entirely through the material. Such a liner provides an absorptive protective layer between the plastics coating and the hand, which absorbs perspiration, guards the hand against the effects of any chemical reaction between perspiration and the constituents of the plastics coating and also provides comfort in use.

To manufacture the liners, pieces of the fabric having glove-shaped profiles were previously stamped out of the fabric and pairs of the pieces sewn together by machine, which is manually guided around the profile, the machine also being arranged to trim the material at a fixed distance from the stitching at the same time. Any inaccuracy in the stitching, especially in the region between the thumb and first finger and the regions between the fingers themselves, however, can lead to a lack of snug fit of the liner when it is placed on the former and this, in turn, leads to puckering and poor penetration by the polyvinyl chloride.

Moreover, there is a tendency for the polyvinyl chloride to mushroom through the holes in the fabric, which destroys the comfort of the liner. This phenomenon, which is known as "strike through", is a particular problem in the production of light weight gloves where it is desirable to use a light weight fabric and a plastisol of relatively low viscosity. The problem can be avoided either by using heavier weight fabric, for example, of 6 and 7 oz. per square yard or alternatively by using a more viscous plastisol but either of these solutions to the problem of strike through imposes a minimum weight limitation on gloves so produced.

The invention provided a method of making a glove liner or a mitt liner from a woven or knitted fabric coated on one side with a suitable material (as hereinafter defined) by cutting and heat welding the fabric so as to form a liner in which two appropriately shaped pieces of the fabric are joined together by heat welding around the marginal portion of the liner, the heat welding having been carried out with the coated sides of the fabric together.

The liner can be used as a glove or mitt itself but if it is to be used to line a plastics-coated glove or mitt, which will generally be the case, it is advantageously placed on a former with the pre-coated surfaces outermost, and dipped in a plastisol which is then cured or gelled. The plastisol may be either polyvinyl chloride or polyurethane. For a light weight glove, the outer coating should be about 0.015 inches to 0.020 inches in thichness.

If the liner is to be used in this way, the material with which the fabric is initially coated or "pre-coated" should be able to marry with the plastisol into which the liner is dipped. When the plastisol is polyvinyl chloride or polyurethane, polyurethane can also be used as the pre-coating but, preferably, the material with which the fabric is precoated is an acrylonitrile butadiene rubber commonly known as nitrile rubber. This is because nitrile rubber is unaffected by the temperature of the plastisol into which the liner is dipped to form a plastics-coated glove and has good elasticity and resilience. Furthermore, it is relatively inexpensive.

By making the liner by heat welding a pre-coated fabric in accordance with the invention the inevitable inaccuracies accompanying manually guided sewing techniques can be avoided, and repeatability and standardisation of the liners can be achieved as well as an increase in the speed of production of the liners leading to economy in production.

The pre-coating on the liner can also prevent strike-through when the liner is subsequently dipped into the plastisol and thus can considerably facilitate the production of light weight gloves and also makes possible the production of gloves even lighter in weight.

The thickness of the pre-coat is advantageously within the range of from 0.005 inches to 0.010 inches but as the material of the pre-coat penetrates into the fabric of the liner to a certain extent it will generally be found that a pre-coat of a thickness within this range leads to an overall increase in the thickness of the liner of about 0.003 inches to 0.004 inches. If a cotton or rayon cotton interlock of 4½ oz. per square yard is used for the fabric of the liner, a pre-coating of a thickness within the range specified above leads to an overall increase in weight of the liner of only one-half oz. per square yard. A liner made from such a pre-coated fabric will therefore be significantly lighter than a liner made from the fabric generally used which as mentioned above is of about 6 to 7 oz. per square yard.

When the pre-coating material is a nitrile rubber, as preferred, the coating is advantageously applied to the fabric by foaming the nitrile rubber, spreading the foam on one side of the fabric and then partially curing the nitrile rubber so that the resultant material is not tacky to touch but is still heat weldable. Preferably, the nitrile rubber pre-coating is cured at a temperature of approximately 75° to 80°C for 1 minute. The coating is advantageously applied in a continuous process, the fabric being passed through spreader means and then through a curing zone. With such a process, the fabric may be coated at a rate of up to 4 meters/minute.

Pairs of appropriately shaped pieces of the fabric having the desired profile may be cut out from the pre-coated fabric brfore heat welding to form liners. Preferably, however, the cutting and heat welding of each liner is carried out in one operation. This may be carried out by using a cut-weld knife comprising a knife blade arranged to stamp out the appropriately shaped pieces of fabric and an electrode located within the cutting edge of the knife blade arranged to heat weld the pieces together around their marginal portions as they are stamped out. This technique may conveniently be used to prepare more than one liner at a time for it has been found that a plurality of liners, one on top of each other, may be heat welded in a single operation. As many as six liners can be welded satisfactorily in one operation.

A liner of a conventional shape, that is to say, the shape of a hand lying flat on a surface with the fingers and thumb spread out so that the thumb extends at an acute angle to the first finger, has a substantially V-shaped crutch between the thumb and first finger and between each of the other fingers. The term "crutch" is used throughout the specification to refer to the portions of the liners connecting the base portions of adjacent finger stalls or connecting the thumb and first finger stalls. When a liner of this shape is placed on a three-dimensional former in which the thumb extends parallel to the fingers over the palm of the hand, the fabric tends to pucker in the region between the thumb and the first finger. This puckering can lead to poor adhesion and unevenness of the plastics coating when the former and the liner are subsequently dipped. Also, with this shape of liner there is a tendency for "suspension" to occur between the liner and the former in the region of the crutch between the thumb and first finger. This means that the liner does not fit closely against the former in the region of the crutch but rides up away from the liner. Suspension may also occur between the fingers. If there is suspension between the liner and the former there will also be suspension between the finished glove and the hand of a user.

Puckering and suspension may not be disadvantageous in samll sized gloves, for example, ladies size 6½. This is because gloves of such sizes are generally used by people doing light work. Thus the conventional shape can be used perfectly satisfactory for small sizes. With larger size gloves, for example, size 7½ and upwards, users of which often wish to do heavy work gripping large or bulky objects, a considerable strain is often imposed on the region of the glove between the thumb and first finger, which may be greatly increased if there is a suspension, and the glove may become damaged of ruptured very quickly.

Advantageously, the shape of the liner is such that the indentation between the thumb and the first finger has the shape of a substantially parallel-sided open-ended slot, the centre line of the slot curving inwards towards the palm of the hand and extending below the first finger, the closed end of the slot being rounded. A liner of such a shape has a rounded crutch between the thumb and first finger when placed on a three-dimensional former of either a right or left hand and puckering and suspension in this region can be reduced or avoided. Thus, the resultant glove can be both longer lasting and better to wear, as less strain is imparted to the region of the glove between the thumb and first finger and greater freedom of movement can also be obtained.

Advantageously, the slot between the thumb and the first finger is arranged to end substantially below the crutch between the first and second fingers and, preferably, the centre of curvature of each side of the slot lies in the region of the crutch between the second and third fingers. The exact dimensions of the slot and the radii of curvature of the sides of the slot will vary according to the size of the gloveto be made. For example, for a size 8½ glove, the thumb side of the slot advantageously has a radius of curvature of approximately 3 3/16 inches and the other side approximately 2¾ inches, the centre of curvature being in the region of the crutch between the second and third fingers. In the size 8½, the length of the slot is preferably such that the width of the palm from the closed end of the slot to the other side of the liner is approximately 3 inches.

Suitable dimensions for the slot for the other sizes of glove can readily be achieved in practice.

Advantageously, the crutch between each of the fingers is also rounded so as to reduce or avoid suspension between the fingers.

The invention also provides a liner made by the method of the invention and a glove or mitt made by the method of the invention.

The following Example illustrates the invention.

A circular knitted fabric, such as interlock of approximately 4½ oz. per square yard, was slit longitudinally and opened out to give a single layer 54 inches in width. The fabric was then rolled onto a carboard tube of approximately 3 inch bore.

The fabric was then fed through rollers and stretchers into an oven at the rate of about 6 feet per minute. The oven was provided at the "feeder end" with a spreader knife and an aqueous based nitrile rubber foamed by means of a stirring action was transferred onto the spreader knife which spread the foam evenly over the fabric. Guides for the fabric as it passed underneath were also provided. From the spreader knife the fabric was carried on a conveyor belt in a horizontal plane through the oven beneath a predetermined number of infra-red heaters which cause the nitrile rubber coating to be partly cured or gelled to the fabric. At the "feed out" end of the oven further rollers and stretchers were provided and the fabric was re-rolled on to the same cardboard tube.

Two rolls of the fabric pre-coated on one side were mounted to give an output of two sheets together, with the pre-coating innermost, that is to say, with the pre-coated sides in contact with each other. A cut-and-weld knife was then used to blank out the required shape or profile, thus producing a pair of appropriately shaped pieces of the fabric, and at the same time to weld the margins of the pair together using a radio frequency welding technique, the welded margins being one-eighth inch in width. The cut-and-weld knife comprised a knife blade of the appropriate shape with an electrode for the heat welding being set and spring-loaded within the cutting edge of the knife blade.

The liner thus produced was fitted to an appropriate size former and then dipped in a plastisol of polyvinyl chloride in a known manner.

The invention will now be described, by way of example, with reference to the accompanying drawings, in which.

Figure 1:
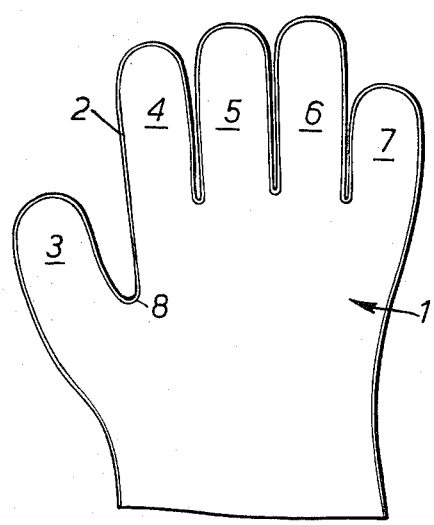
FIG. 1 is a first form of liner not in accordance with the invention.
Figure 2:
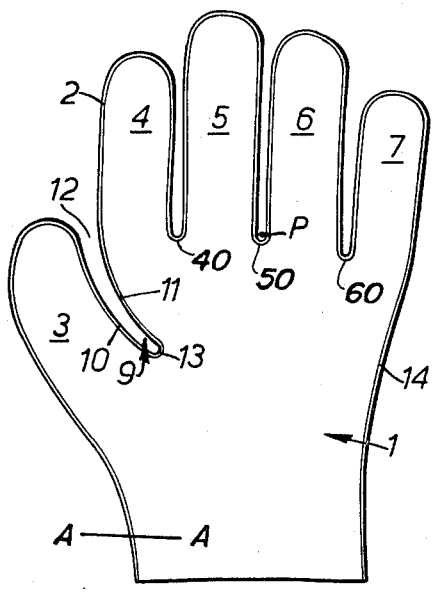
FIG. 2 is a second form of liner in accordance with the invention.
Figure 3:
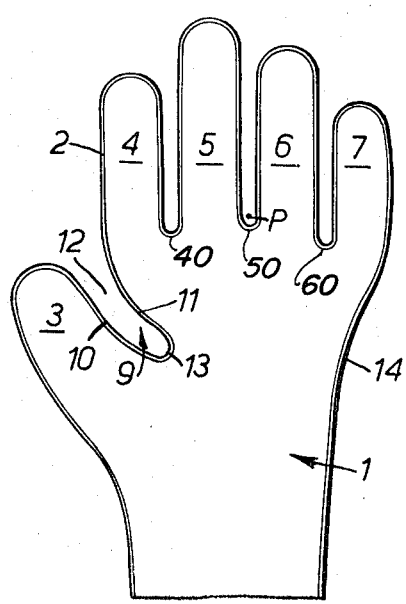
FIG. 3 is the third form of liner in accordance with the invention.
Figure 4:
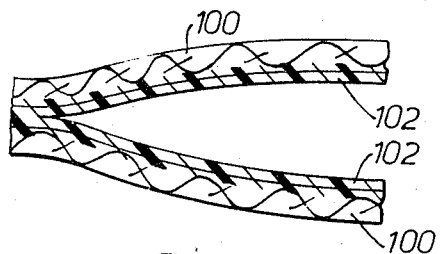
FIG. 4 is a section through the liner of FIG. 2 taken along the line A—A on a larger scale.

Referring to the accompanying drawings, FIGS. 1, 2 and 3 show liners, each of which is indicated generally by the reference numeral 1, and each of which is formed from two identically-shaped pieces of interlock 100 coated with nitrile rubber 102 (see FIG. 4) heat welded together around marginal portion 2 of the liner with the coated sides of the two pieces 100 innermost as shown. The two pieces 100 of the liner 1 shown in FIG. 1 are each of the conventional shape, that is to say, the shape of a hand lying flat on a surface with a thumb stall 3 and finger stalls 4 to 7, respectively, spread out so that the thumb stall 3 extends at an acute angle to the first finger stall 4. Such a shaped liner has a V-shaped crutch 8 between the thumb stall 3 and the first finger stall 4 and also has V-shaped crutches between the other fingers. This shape of liner is suitable for a ladies size 6½ glove but tends to pucker in the region between the thumb stall 3 and first finger stall 4 when used to produce larger sized gloves. Also there is a tendency for suspension to occur with such a shaped liner in the larger sizes as previously explained.

The shape of the liner of FIG. 2 differs from that shown in FIG. 1, by the fact that there is an indentation between the thumb 3 and the first finger stall 4 in the shape of a slot, indicated generally by the reference numeral 9, having sides 10 and 11 substantially uniformly spaced from each other along the length of the slot, an open end 12 and a closed rounded end 13. the centre line of the slot 9 curves in towards the center of the liner and ends substantially below crutch 40 between the first finger stall 4 and the second finger stall 5. The centre of curvature of sides 10 and 11 of the slot is marked by the letter P in the region of crutch 50 between the second finger stall 5 and the third finger stall 6. The liner 1 shown in this Figure is suitable for a size 9½ glove, the radius of curvature of the side 10 of the slot 9 being 2⅞ inches, that of the side 11 being 2⅝ inches and the width of the palm from the end 13 of the slot 9 to side 14 of the liner being 4 inches. Crutches 40, 50 and 60 between finger stalls 4, 5, 6 and 7, respectively are also rounded, and the finger stalls are more spaced apart than in the liner shown in FIG. 1.

FIG. 3 shows a liner 1 similar to that of FIG. 2 but suitable for a size 8½ glove, similar features having the same reference numerals as in FIG. 2. In FIG. 3, the radius of curvature of the side 10 of the slot 9 is 3 3/16 inches, that of theside 11 is 2¾ inches and the width of the palm from the end 13 of the slot 9 to the side 14 being 3 inches. The crutches between the finger stalls 4, 5, 6 and 7 are also rounded. When such a liner is coated with polyvinyl chloride to form a glove the unspecified dimensions of the glove conform to B.S. 1651–1966.

Figures 5, 6:
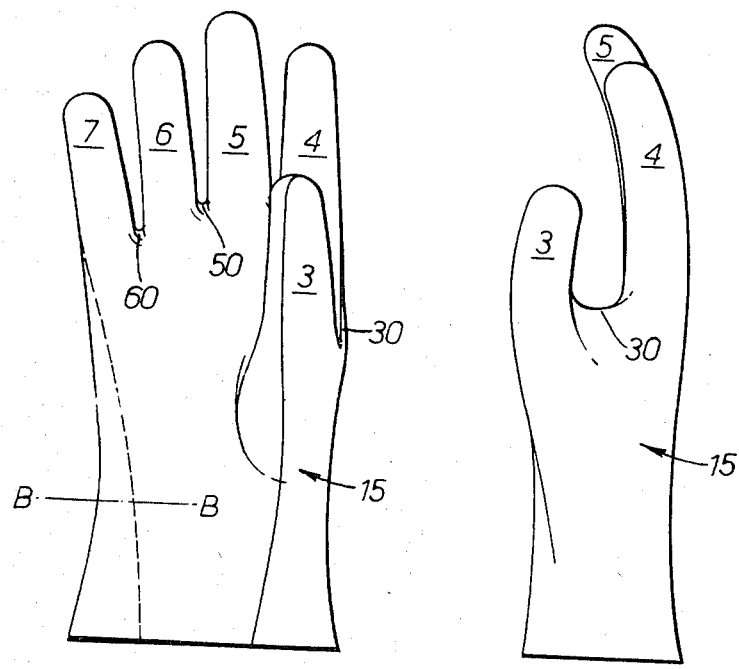
FIG. 5 is a perspective front view of a glove in accordance with the invention.
FIG. 6 is a perspective side view of the glove of FIG. 5.
Figure 7:
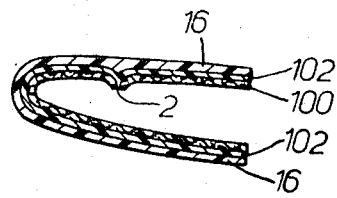
FIG. 7 is a section through the glove taken along the line B—B in FIG. 5.

To form a glove, indicated generally by the reference numeral 15 in FIGS. 5 to 7, the liner 1 of either FIG. 2 or FIG. 3 is placed with the coating 102 outermost on the appropriate size former of either a right or a left hand and the liner 1 is provided with an outer plastics coating 16 on top of the coating 102 by dipping the liner into a plastisol. As can be seen in FIGS. 6 and 7, the slot 9 provides a crutch 30 between the thumb stall 3 and the first finger stall 4 (the same reference numerals being used for the glove as for the liner) which is rounded as are the crutches 40, 50 and 60 between the finger stalls 4, 5, 6 and 7 as compared with the V-shaped crutches obtained when the liner of FIG. 1 is placed on either a right or left hand former.

I claim:

1. A liner for a glove which comprises two generally hand-shaped pieces of an absorbent knitted fabric united together around a portion of their margins, a heat-weldable coating on one side of each of said pieces which is bonded to said fabric, a heat-welded joint uniting the coated sides of sjaid pieces around said portion of their margins, an indentation between the thumb stall and the first finger stall of each of said pieces in the form of an open-ended slot, the center line of which curves in towards the center of the liner and extends below the first finger stall, the sides of the slot being substantially uniformly spaced from each other along the length of the slot until they terminate in a rounded end portion.

2. A liner as claimed in claim 1, wherein coating on each of said pieces is of a nitrile rubber.

3. A liner as claimed in claim 1, wherein the coating on each of said pieces is of a thickness within the range of from 0.005 inches to 0.010 inches.

4. A liner as claimed in claim 1, wherein the slot between the thumb stall and the first finger stall terminates substantially below the crutch between the first and second finger stalls.

5. A liner as claimed in claim 1, wherein the sides of at least a portion of the slot are arcs of concentric circles, the center of which lies in the region of the crutch between the second and third finger stalls.

6. A liner as claimed in claim 1, wherein the crutch between each of the finger stalls is rounded, the finger stalls being spaced apart from each other.

7. A glove including a liner which comprises two generally hand-shaped pieces of an absorbent knitted fabric united together around a portion of their margins, a heat-weldable coating on one side of each of said pieces which is bonded to said fabric, a heat-welded joint uniting the coated sides of said pieces around said portion of their margins, an indentation between the thumb stall and the finger stall of each of said pieces in the form of an open-ended slot, the center line of which curves in towards the center of the liner and extends below the first finger stall, the sides of the slot being substantially uniformly spaced from each other along the length of the slot, said sides terminating in a rounded end portion, and a plastics coating on the side of the liner having said heat weldable coating.

8. A glove as claimed in claim 7, wherein said plastics coating is of polyvinyl chloride and the thickness of said plastics coating is within the range of from 0.015 inches to 0.020 inches.

* * * * *